March 23, 1943. D. G. ASHCROFT 2,314,606
APPARATUS USEFUL FOR THE MANUFACTURE OF ELECTRIC BLASTING CAPS
Filed June 11, 1941 7 Sheets-Sheet 1

Donald G. Ashcroft
INVENTOR

BY
ATTORNEY

March 23, 1943.     D. G. ASHCROFT     2,314,606
APPARATUS USEFUL FOR THE MANUFACTURE OF ELECTRIC BLASTING CAPS
Filed June 11, 1941     7 Sheets-Sheet 2

Donald G. Ashcroft
INVENTOR
BY Thos. A. Wilson
ATTORNEY

March 23, 1943.　　　D. G. ASHCROFT　　　2,314,606
APPARATUS USEFUL FOR THE MANUFACTURE OF ELECTRIC BLASTING CAPS
Filed June 11, 1941　　　7 Sheets-Sheet 3
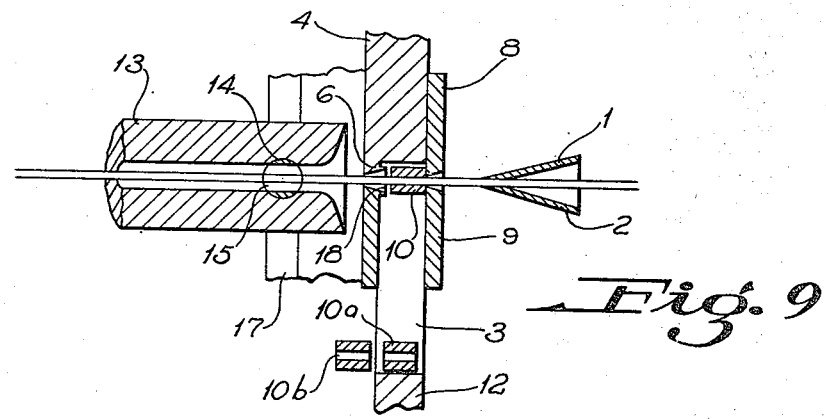
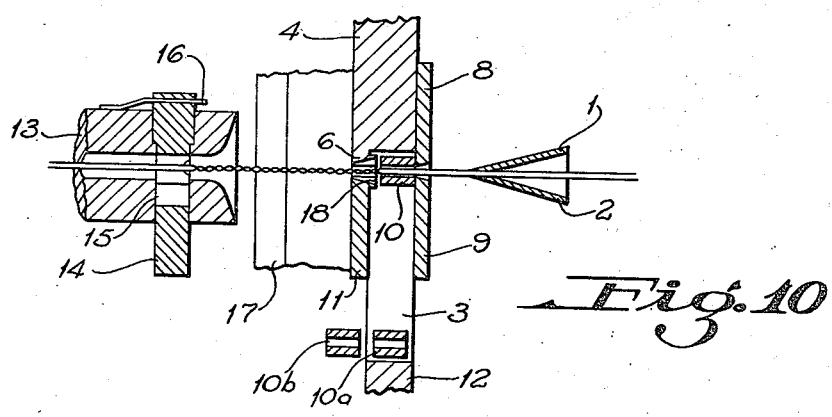
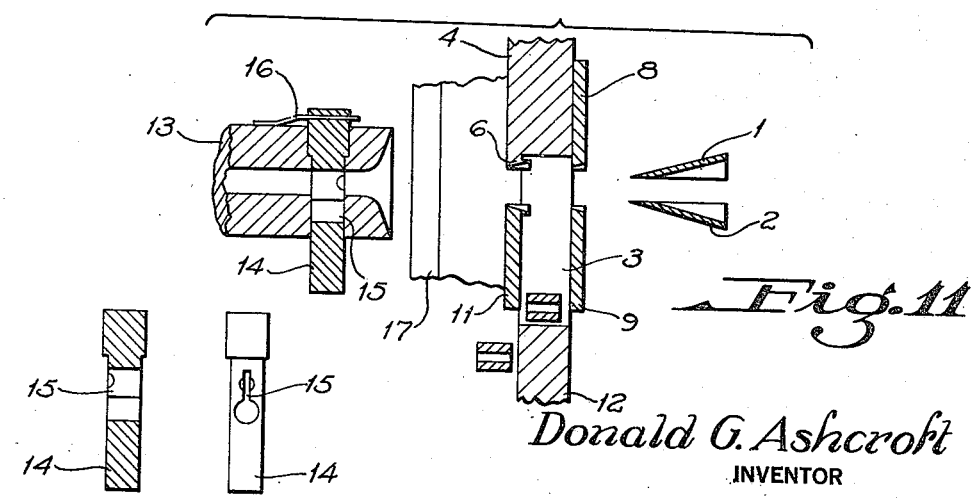
Donald G. Ashcroft
INVENTOR
BY Thos. A. Wilson
ATTORNEY March 23, 1943.        D. G. ASHCROFT        2,314,606
APPARATUS USEFUL FOR THE MANUFACTURE OF ELECTRIC BLASTING CAPS
Filed June 11, 1941        7 Sheets-Sheet 4
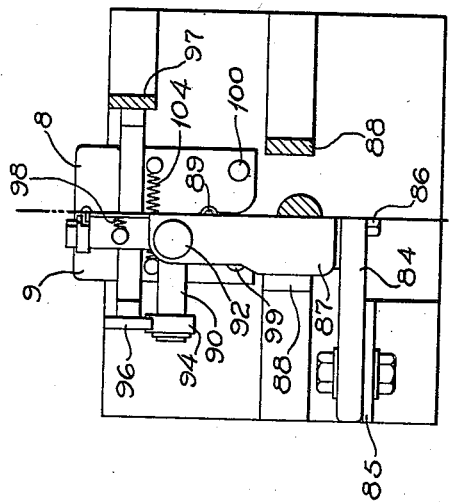
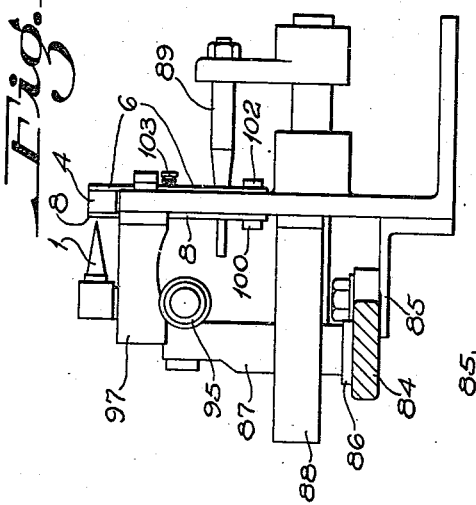
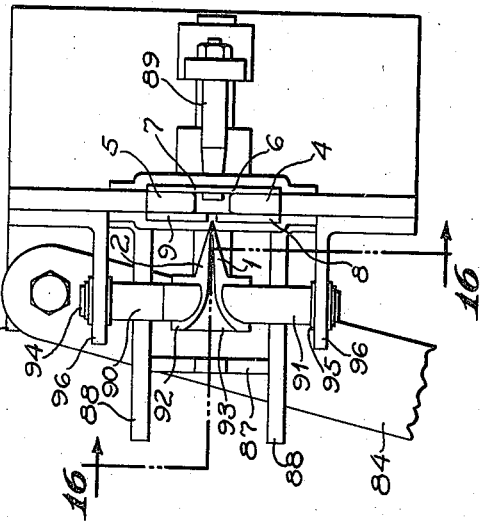
*Donald G. Ashcroft*
INVENTOR
BY
ATTORNEY March 23, 1943.   D. G. ASHCROFT   2,314,606
APPARATUS USEFUL FOR THE MANUFACTURE OF ELECTRIC BLASTING CAPS
Filed June 11, 1941   7 Sheets-Sheet 5
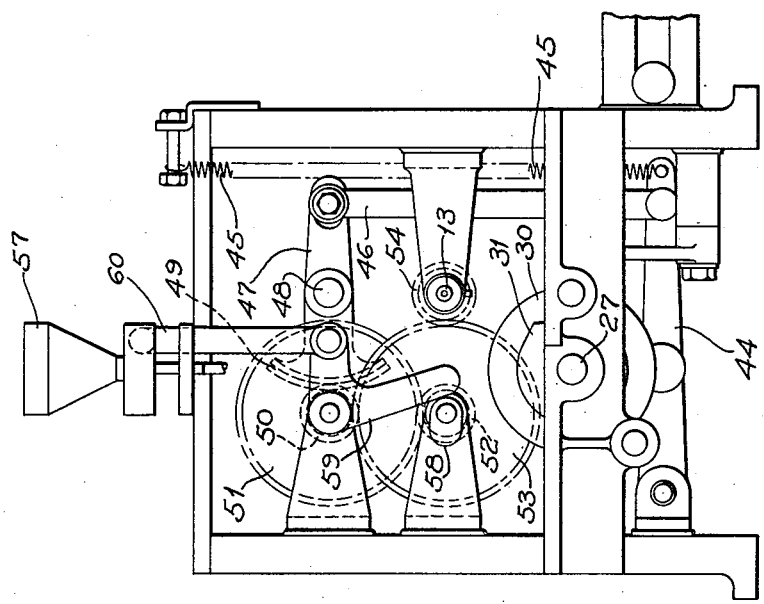
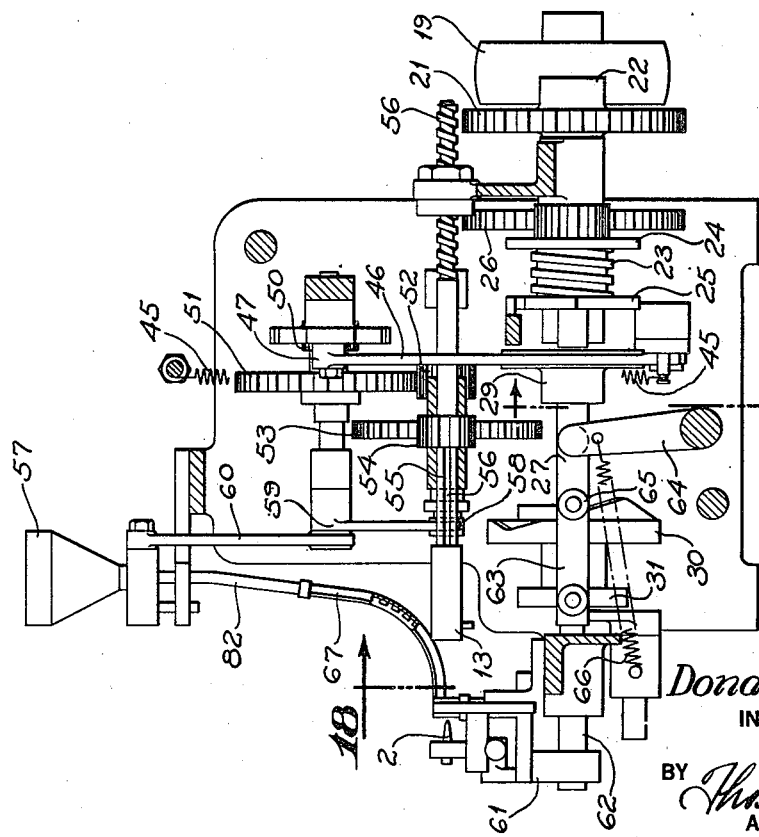
Donald G. Ashcroft
INVENTOR
BY Thos. A. Wilson
ATTORNEY March 23, 1943.　　　D. G. ASHCROFT　　　2,314,606
APPARATUS USEFUL FOR THE MANUFACTURE OF ELECTRIC BLASTING CAPS
Filed June 11, 1941　　　7 Sheets-Sheet 6
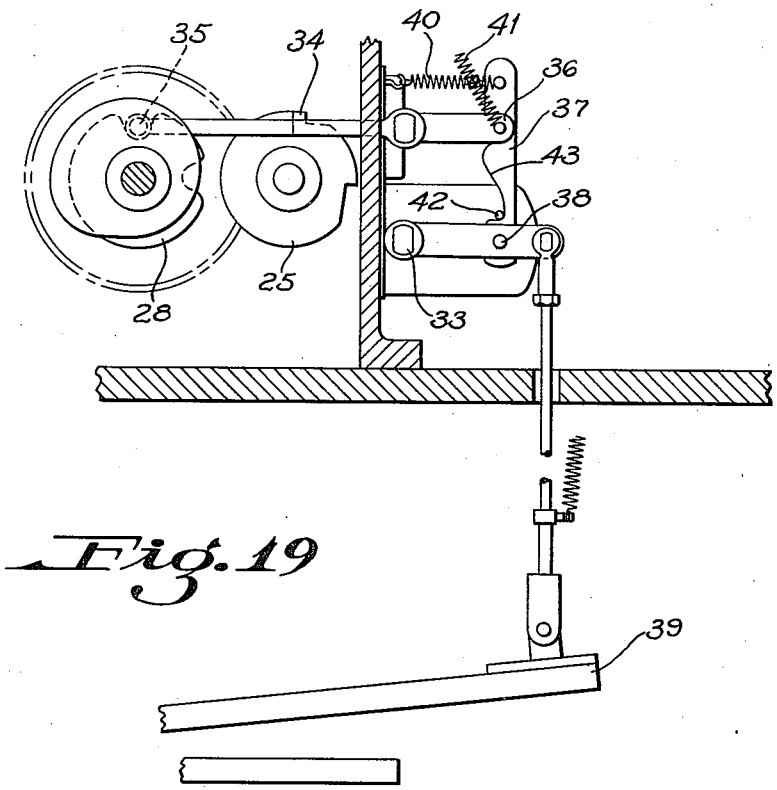
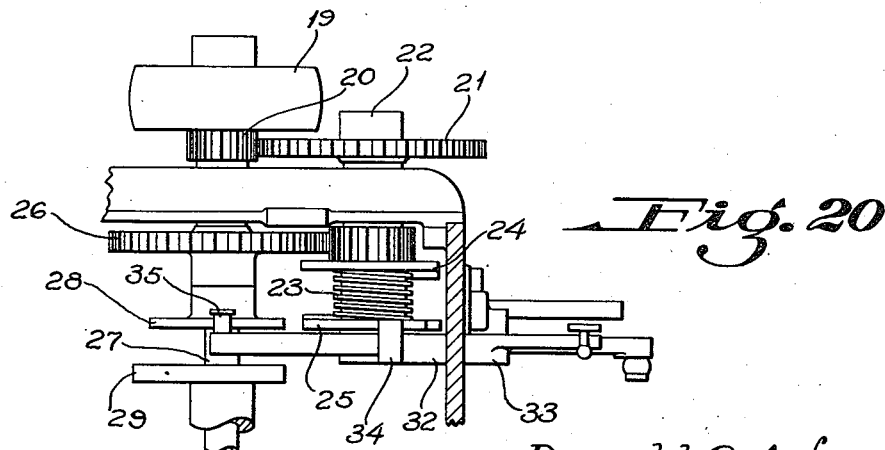
Donald G. Ashcroft
INVENTOR
BY Thos A Wilson
ATTORNEY March 23, 1943.  D. G. ASHCROFT  2,314,606
APPARATUS USEFUL FOR THE MANUFACTURE OF ELECTRIC BLASTING CAPS
Filed June 11, 1941  7 Sheets-Sheet 7
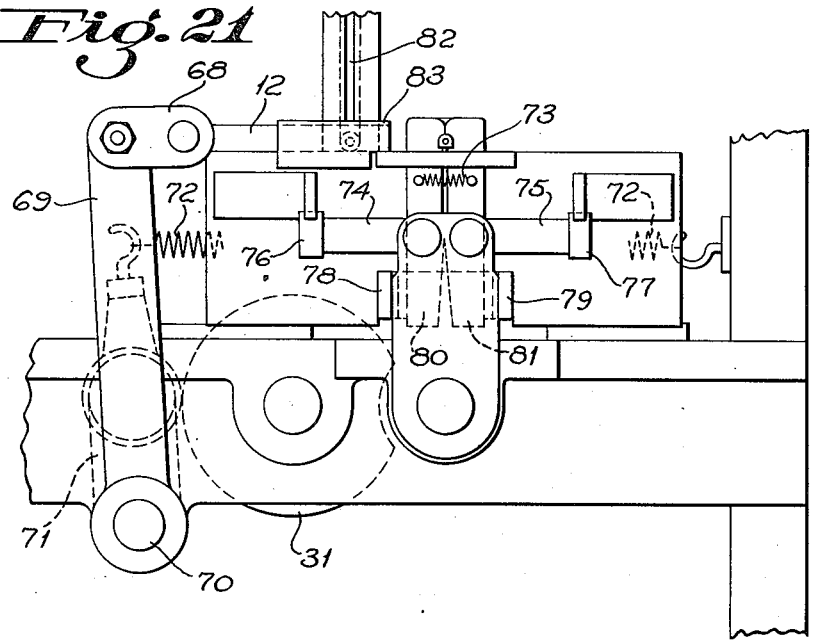
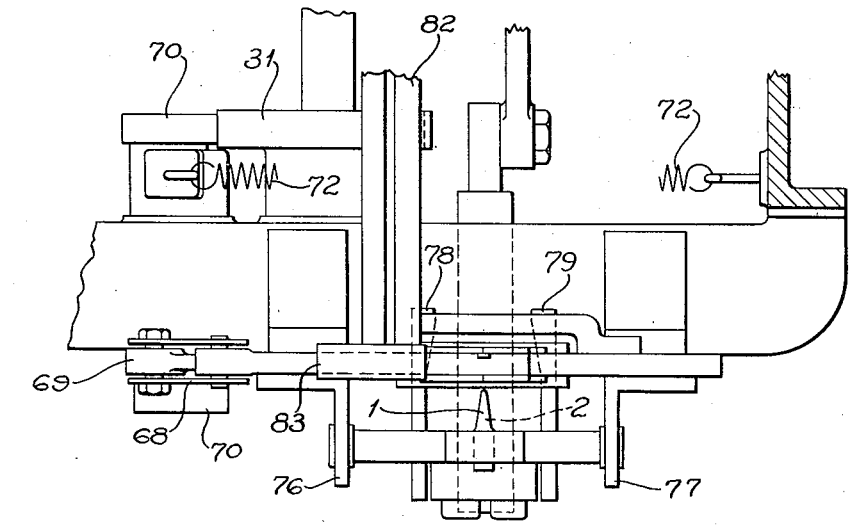
Donald G. Ashcroft
INVENTOR
BY Thos. A. Wilson
ATTORNEY Patented Mar. 23, 1943

2,314,606

UNITED STATES PATENT OFFICE 2,314,606

APPARATUS USEFUL FOR THE MANUFACTURE OF ELECTRIC BLASTING CAPS

Donald George Ashcroft, Saltcoats, Scotland, assignor to Imperial Chemical Industries Limited, a corporation of Great Britain Application June 11, 1941, Serial No. 397,561
In Great Britain June 12, 1940

13 Claims. (Cl. 86—1)

This invention relates to a device for use in threading wires through a tubular plug or the like annular object of resilient material. It is especially applicable to the threading of insulated leading wires through small apertured plugs.

According to one method of manufacturing electric initiating devices, e. g., electric detonators, the closure is brought about by crimping the metal tube around a tubular plug of resilient material through which pass the twisted and insulated leading wires. The most satisfactory order of assembly is to place the plug on the wires first, either before or after twisting, then to solder a fusehead to the wires and then to insert the assembly into the metal tube. The step of threading the insulated wires through the plug has hitherto been carried out by hand, after they have been twisted together.

This invention has as an object to devise a machine which will facilitate the threading of resilient apertured plugs on to wires. The invention has also the object to devise a machine that will both facilitate the threading of previously insulated wires on to such plugs, and give the wires the desired twist in the same operation. Other objects will appear hereinafter.

According to the present invention the device comprises a reciprocating longitudinally separable needle, adapted when its parts are closed, to enter the perforation of the plug, or like annular object, and, by separation of its parts when within the perforation, to expand the object and permit the wires to be passed therethrough; means whereby the object is held with its perforation in the path of the needle so that the needle traverses the object when moving in one direction; and means for removing the object from the needle when it is moving in the reverse direction.

According to one form of the invention the device comprises a reciprocating longitudinally separable needle adapted when its parts are closed, to enter the perforation of the object, and by separation of its parts when within the perforation, to expand the object and permit the wires to pass therethrough; a holder adapted to hold the object with its perforation in the path of the needle; a stop which by preventing the object from moving with the needle when it is moving in one direction causes the object to ride on to the needle; and a wiper which removes the object from the needle when it is moving in the reverse direction.

In a preferred form of our invention the object is held between two gates of which the one first reached by the needle when moving to enter the perforation of the object acts as the wiper, and the other gate acts as the stop, the perforation being in alignment with the openings in the gates.

The wiper gate permits the passage of the needle when moving in either direction, and permits the threading of the wires, but does not permit the passage of the object when the needle is moving away from the threading position after the wires have been threaded. In this form of the invention the stop gate prevents the forward passage of the object while the needle is moving through the latter but opens to permit the passage of the wires through the fully distended object.

The stop gate may be formed with a ridge or the like deforming member tending to splay out the end of the object carried against it on the needle, and prevent the perforation from being squeezed shut.

This deforming member is positioned so that its centre of symmetry is in line with the axis of the perforation. If the object is circular it may take the form of arcuate ridges projecting from each portion of the gate of a diameter less than that of a circle drawn half way between the perforation and the periphery of the object.

According to the invention, in order to impart a twist to the wires, there may be provided means for rotating the forward ends of the wires relatively to each other while they are held from rotation rearwardly.

This may take the form of a forward slotted member reciprocating in time with the needle, having a turning movement about its axis, and a movement in the direction of its axis, such that the wires, when inserted therein, are compelled to follow the turning movement of the slotted member but not its axial movement. During this movement the wire is rearwardly held, advantageously by the gates, so that the wires become twisted together.

The invention is illustrated in the drawings accompanying the provisional specification and in those attached hereto.

Figs. 1–5 illustrate a simple form of the invention which is a threading device and does not include a twisting device. Each of Figs. 1–5 is a horizontal section of a portion of the threading device through the axis of a resilient plug when it is in the threading position. Figs. 6–11 illustrate a horizontal section of a form of a threading device according to the invention, with which is incorporated a twisting device. Figs. 12 and 13 illustrate a detail of the device shown in Figs. 6–11.

Fig. 14 represents a side view of an apparatus designed to thread the plugs only and to be operated by hand. The handle is shown in section for convenience. Fig. 15 is a plan view of the apparatus of Fig. 14, while Fig. 16 is a section along the line A—A of Fig. 15.

Fig. 17 represents a side elevation of a machine equipped with both threading and twisting device and designed to be power driven. The side frame of the machine and the brackets mounted on that frame have been removed to show the machinery within the apparatus.

Fig. 18 is a section, through the line B—B on Fig. 14.

Figs. 19 and 20 are an elevation and plan of a part of the machine showing the drive and the clutch mechanism while Figs. 21 and 22 are a plan and elevation of the part of the machine where the actual threading and twisting is performed.

Figure 1:
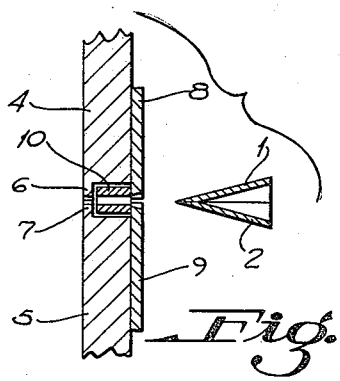

Fig. 1 illustrates the positions of the various parts at a point halfway through the forward stroke of the needle at which point in the cycle of operation it is most convenient to put the plug into the threading position. In this figure, 1 and 2 represent the two parts of the separable needle which are spring pressed together to form a hollow elongated cone shaped body which can reciprocate along its axis. The plug holder is made up of a base plate 3, which can best be seen in Fig. 5 and which is grooved to take the plug, two side pieces 4 and 5 each fitted with an extension 6 and 7, and the separable leaves 8 and 9 of a gate. The parts 4 and 5 are spring loaded to press the extensions 6 and 7 together at a point in alignment with the axis of the cone made by 1 and 2. The gate 8 and 9 is also held closed by springs in the same alignment. The width of the side parts 4 and 5, and the length of 6 and 7 are such that the space left between them and the gates will receive a plug 10, only if placed with its perforation in alignment with the cone.

Figure 2:
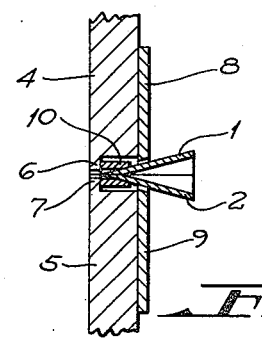

Fig. 2 shows the position of the various parts a little time later in the forward stroke. The points of 1 and 2 have been forced between the leaves 8 and 9 causing them to open against their springs, and have entered the perforation of the plug 10. This plug is restrained from motion by the extensions 6 and 7.

Figure 3:
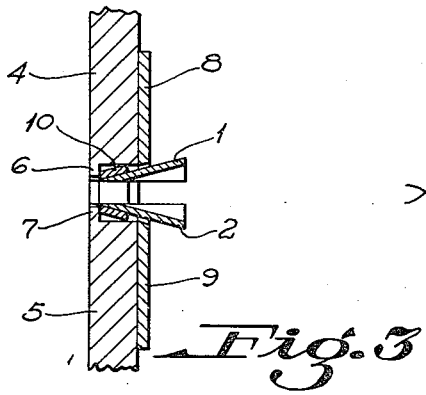

As the forward stroke continues the points of 1 and 2 pass right through the plug 10 and between the extensions 6 and 7 thereby forcing the side pieces 4 and 5 apart. At this point in the cycle the two parts 1 and 2 separate, suitably by the action of stationary cams, and in so doing they force open the gates formed by 6 and 7 and by 8 and 9, and distend the plug. This position is shown in Fig. 3 from which it will be seen that a clear passage is opened between the parts 1 and 2 through which the wires can be threaded right through the plug.

Figure 4:
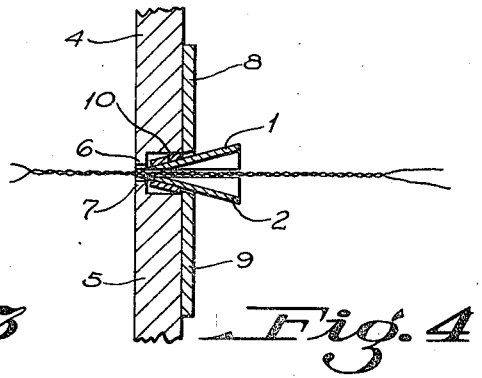

During the first part of the back stroke the parts 1 and 2 close together and permit the extensions 6 and 7 to close on to, and hold, the wires. The leaves 8 and 9, being held open against springs by the parts 1 and 2, close as the parts 1 and 2 retire and wipe the plug off the points of 1 and 2. The movement is shown in progress in Fig. 4. The resistance to any motion of the wires provided by 6 and 7, 8 and 9, and by the plug should be sufficient to prevent the parts 1 and 2 from dragging the wire out of the plug on the back stroke.

Figure 5:
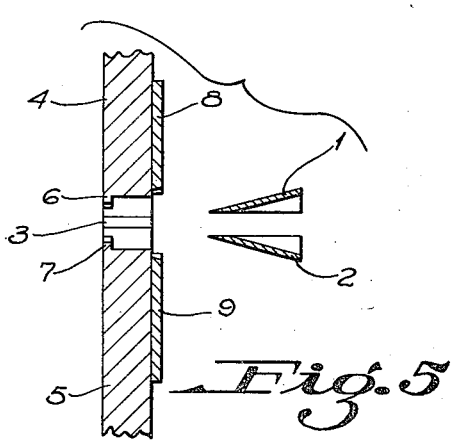

The end of the back stroke is illustrated in Fig. 5. By the action of the cams or other suitable means 1 and 2, 6 and 7, and 8 and 9 are all caused to separate at this point of the cycle, to permit the threaded plug to be removed.

Figs. 6 to 11 are again horizontal sections through the axis of the plug when in the working position and illustrate a form of the invention which has also means for twisting the wires and for feeding the plugs automatically to the working position.

Figure 6:
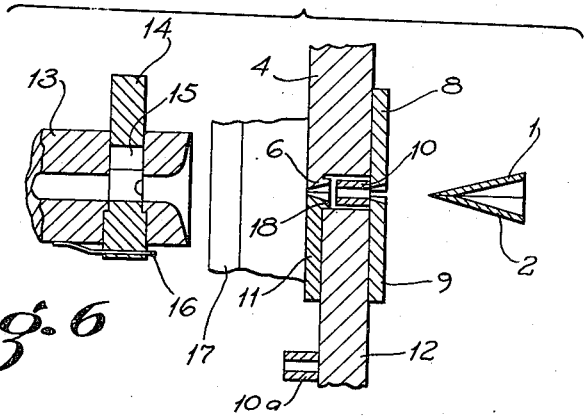

Referring to Fig. 6 the parts 1, 2, 3, 4, 6, 8, 9 and 10 are the counterparts and have the same functions as the parts with the same numbers in Figs. 1–5. For the extension 7, however, is substituted the plate 11 and for the side piece 5 is substituted the rod like member 12 which is arranged to reciprocate in time with the members 1 and 2 and whose function is to bring the plug into the working position. The twisting device 13 consists of a tubular member, lying coaxially with the cone formed by the parts 1 and 2. The end of the member nearest the plug is funnel shaped to assist the feeding of the wires down its central bore. This member is arranged to reciprocate towards and away from the plug but has, as well, a rotary motion about its own axis. The small circular ridge which causes the plug to splay when pressed against 6 and 11 is shown at 18.

The pin 14, illustrated in Figs. 12 and 13, which passes through the tube 13 is slotted at 15 to form a keyhole shaped passage. The pin 14 is held by the spring 16 so that the rectangular portion of the keyhole lies across the central bore. This rectangular portion is only wide enough to hold one wire across its width but long enough to hold two wires along its length. When the tube 13 is at its forward position the cam 17 forces up the end of the pin 14 so that the circular portion of the keyhole 15 becomes coincident with the central bore of the tube 13, thus enabling the wires to be passed through easily.

In Fig. 6 the rod 12 has just delivered the plug 10 to the working position, the parts 1 and 2 are approaching the gate 8, 9, and the tube 14 is approaching the other end of the plug 10.

Figure 7:
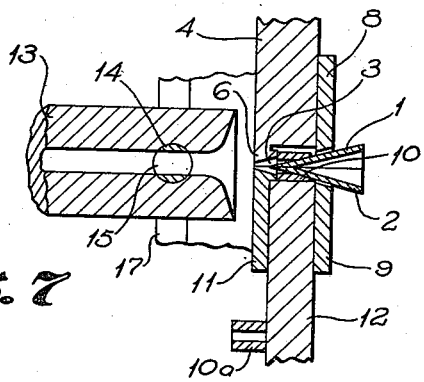

In Fig. 7 the parts 1 and 2 are traversing the plug, the gate 8, 9 having been forced open by the points of 1 and 2, the tube 14 has reached its forward position, while the rod 12 has started its back stroke.

Figure 8:
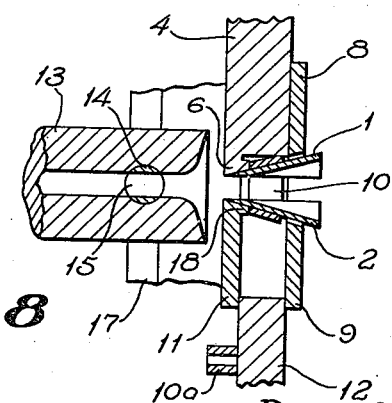

In Fig. 8 the points of 1 and 2 have passed through the gate formed by the extension 6 and the plate 11 and have separated to distend the plug. As the cam 17 is forcing in the pin 14 there is now an unimpeded passage so that the wires can be passed easily through the plug and into the tube 14. The rod 12 is still on its back stroke.

In Fig. 9 the parts 1 and 2 have completed half the back stroke and closed together, the gate formed by 6 and 11 has closed on the wires and the gate 8 and 9 has closed and wiped the plug off the parts 1 and 2. The rod 12 has completed its back stroke and a new plug 10a has been fed in front of it from a hopper by gravity.

In Fig. 10 the parts 1 and 2 are in the same position as in Fig. 9 and the wires are held by the parts 1 and 2, the gate 8, 9, the gate 6, 11 and are also held from longitudinal movement by the plug 10 which is held between the gates. At this stage in the cycle the parts 1 and 2 remain stationary for a short time while the tube 14 does its complete backstroke. When this backstroke commences the pin 14 slips off the cam 17 so that the wires are lightly held in the rectangular part of the slot 15. This hold is such that the rotatory movement of the tube 14 will carry the wires round with it while its longitudinal movement will not be transmitted to the wires. The result of the two movements is therefore to twist the wires together.

In Fig. 11 the parts 1 and 2 have come to the end of the backstroke and have opened, as have both the gates, leaving the wires only lightly held by the slot 15. From this hold the wires can be easily pulled, having been threaded through the plug, and twisted together, to leave two short lengths of untwisted wire at one end for soldering to the fusehead. The rod 12 is bringing the plug 10a into the working position.

Referring to Figs. 14, 15 and 16, a handle 84 is pivoted on to a bracket 85 which is mounted on the base plate of the machine. At 86 on the handle 84 is mounted a carriage 87 which runs between the guides 88 and can move horizontally. This carriage carries the two piece separable needle 1, 2 and also a cam rod 89.

Each part 1 and 2 of the needle is mounted on an L-shaped crank 90 and 91. These cranks are pivoted at 92 and 93. At their horizontal extremes they carry ball bearing wheels 94 and 95 which are pressed against the lower surfaces of two cam rods 96 and 97. The pressure is maintained by means of the spring 98 which holds the vertical arms of the two cranks together. The two leaves 8 and 9 of the one gate are pivoted at 99 and 100 respectively, while the parts 4 and 5 carrying the leaves of the gate 6 and 7 are pivoted at 101 and 102. The pivot 101 cannot be shown on any of the drawings but lies behind the pivot 102 on Fig. 14 and behind the pivot 99 on Fig. 16. Both the gates are kept closed by means of springs 103 and 104. The machine in Figs. 14 and 16 is shown in the same position as in Fig. 1. To operate the machine a plug is placed in the threading position between the gates and the lever 84 is pressed forward. When the point of the needle has penetrated the gate 8, 9, the plug and the gate 6, 7, the surface of the cam 97 bears down on the wheel 95 and causes the needle to divide. The division of the needle expands the plug and forces open the gates. The cam 96 has simultaneously been acting on the wheel 94 in the same manner. The wires can now easily be threaded through the plug. On pulling the lever 84 back the gates close under the influence of the springs 103 and 104 and remain shut until the carriage 87 has been pulled towards its rearward position. Here the cam 97 will again force down the wheel 95 to open the needle and the cam rod 89, working between the leaves of the gates as shown in Fig. 16, will force the gates to open, thus enabling the threaded plug to be removed.

The driving mechanism of the power driven device is illustrated in Figs. 17, 19 and 20. Referring to these drawings and more particularly to Fig. 20, 19 represents a pulley adapted to be driven by a belt. From this pulley the power is transmitted through the gears 20 and 21 to the shaft 22. Around shaft 22 is the spiral spring 23 the ends of which are attached to the gear wheel 24 and to the ratchet wheel 25 both loosely mounted on the shaft 22. The spiral spring 23 grips the shaft 22 with sufficient friction for the power to be transmitted through it to the gear 24, unless the ratchet wheel 25 is restrained from moving, in which case the spring 23 uncoils to a small extent and releases the grip on the shaft 22 which is then able to idle, and the machine comes to rest. The drive from the gear 24 is conveyed by the gear 26 to the shaft 27 which carries a number of cam wheels. Of these the cam wheel 28 (see Figs. 19 and 20) co-operates with the ratchet wheel 25 to control the clutch mechanism; the cam wheel 29 (see Figs. 17 and 18) operates the twisting device, the cam 30 (see Fig. 17), the reciprocation of the carriage on which the divided needle 1, 2 rides and the cam 31 (see Figs. 17 and 21) controls the slide which brings the plugs one by one to the working position. Referring to Figs. 19 and 20 the object of the clutch mechanism is to arrange for the automatic stoppage of the machine at two points in the cycle. Firstly the machine is stopped at the point when the plug is distended ready for the insertion of the wires and again the machine may with advantage be stopped when the wires are twisted and threaded and are ready to be removed. For this purpose a lever 32 is supplied with a stop 34 adapted to engage with the ratchets on the ratchet wheel 25 and it is also fitted with a ball bearing wheel 35, adapted to run on the cam 28. On the other side of its pivot the end of the lever 32 engages with a notch at 36 on a lever 37 which is pivoted at 38 to another lever, pivoting at 33, which is controlled by the treadle 39. The spring 40 holds lever 37 in contact with the lever 32 while spring 41 pulls the lever 32 against either the cam 28 or the ratchet wheel 25 or both. The cam 28 and the ratchet wheel 25 are so shaped and their relative motion so timed that, when the machine is in a position at which it is desired to stop the machine the lever 32 is free to fall under the influence of the spring 41 and to bring the stop 34 into engagement with one of the ratchets of the wheel 25. The machine can be restarted by depressing the treadle 39 which through the levers 38 and 37 will pull down the end of the lever 32 and so lift the stop 34 from the ratchet. This lever will remain raised with the stop 34 out of engagement with the ratchet until both the cam and the ratchet wheel are again in such a position as to permit it to fall. To guard against the eventuality that the operator may hold the treadle depressed and so permit the machine to run past the stopping point the pin 42 co-acts with the curve 43 on the lever 37 so that, when the treadle 39 is fully depressed the lever 37 is displaced so far that the end of the lever 34 is released from the notch 36.

The operation of the twisting mechanism is illustrated in Figs. 17 and 18. The cam 29 bears on the lever 44, the contact being maintained by means of the spring 45 which is only partly shown on Fig. 17 to prevent it from obscuring other parts of the machine. From the end of the lever 44 the link 46 conveys the motion to one end of a lever 47 which is pivoted at 48 and whose other end terminates in a toothed quadrant 49. The motion of this toothed quadrant is amplified and conveyed by means of the gears 50, 51, 52, and 53 to the sleeve 54. Inside the sleeve 54 is mounted the rod 55 which is screw-threaded at 56 and carries at the other end the tubular member 13, which has been described with reference to Fig. 6. A key within the sleeve 54 co-operates with the key slide 56 to convey the rotary movement of the sleeve 54 to the rod 55. Owing to the screw-threading 56 such rotary movement must be accompanied by a longitudinal movement. Thus for every revolution of the cam 29 the twisting device 13 completes two reciprocating movements, one longitudinal and one circular.

It is advisable that the hopper 57, from which the plugs are fed to the machine, should be given a frequent oscillatory movement in order to prevent the plugs from jamming in the throat of the hopper. This is achieved by mounting a cam 58 on the shaft to which the gears 52 and 53 are fixed. The bell crank 59 is caused to oscillate by this cam and its movement is transmitted to the hopper 57 by means of the link 60.

Referring to Fig. 17 the divided needle 1, 2 is mounted on a carriage 61 which moves with the rod 62, which is connected through the link 63 to the lever 64. On the pin 65, which passes through the link 63 is mounted a ball-bearing wheel which presses against the cam wheel 30 under the influence of the spring 66. For each revolution of the cam 30 which is carried by the shaft 27, the carriage 61 and consequently the divided needle 1, 2 completes a reciprocation. Referring further to Figs. 21 and 22 the slide 12 which pushes the plugs one by one from the foot of the chute 82 to the working position is made to move synchronously with the remaining moving parts by means of the link 68 attached to the lever 69, mounted on the shaft 70, which is caused to oscillate by the lever 71. This lever bears under the influence of spring 72 against the cam 31, which also turns once for every turn of the cams 29 and 30.

The parts 1 and 2 of the divided needle are mounted on L shaped levers each pivoted at its angle and the two parts are kept pressed together by the spring 73. The limbs 74 and 75 of the L shaped levers terminate in ball bearing wheels pressing against the cams 76 and 77. The lower surfaces of these cams are so shaped that they force down extensions 74 and 75 to open the divided needle or allow them to rise to close it in the sequence illustrated in Figs. 6–11.

The gates 6, 7 and 8, 9 are opened and closed in the sequence illustrated in Figs. 6 to 11 by the needle, when it is pressing against them, but when the needle is in the completely retracted position, these gates are opened by the cams 78 and 79 which move with the carriage 61 and engage with extensions of the gates below their pivots. Two of such extensions are shown in Fig. 21 and numbered 80 and 81.

As has been mentioned the plugs are fed in bulk into the oscillating hopper 57 and pass in single file down the chute 82, which is in the form of a tube. This delivers the plugs in front of the slide 12, which reciprocates in the bearing 83, one interior wall of which acts as a stop for the plugs as they emerge from the chute. The end of the chute 82 and this wall of the bearing 83 are so positioned that the plugs are stopped in position in front of the slide 12, and so that no plug can emerge from the end of the chute until the previous one has been removed by the slide 12.

The invention is not confined to an apparatus having a needle which separates into two parts, if necessary, the needle could divide into 3 or 4 or more parts.

The invention can also be used for plugs or like objects which have more then one central passage, in which case the two parts of the needle would in their closed position be the same distance apart as are the two channels in the object. A fixed guide may advantageously be placed between them to prevent the feeding of two wires into the same channel.

As many apparently widely different embodiments of the invention will be apparent without departing from the spirit and scope thereof, it must be understood that the invention is not limited to any specific embodiment except as defined in the appended claims.

I claim:

1. An apparatus, useful in the manufacture of electric blasting caps and the like, for facilitating threading through resilient tubular objects which comprises a reciprocating longitudinally separable needle adapted when its parts are closed to enter the perforation in the object and by separation of its parts, when within the perforation, to expand it; together with means to hold the object with the perforation in the path of the needle, so that the point of the needle when it is moving in one direction passes through the perforation, and means for removing the object from the needle when it is moving in the opposite direction.

2. Apparatus as claimed in claim 1 in which the means to hold the object with the perforation in the path of the needle comprises a stop which, by preventing the object from moving with the needle, causes it to ride on to the needle.

3. Apparatus as claimed in claim 1 in which the means to hold the object with the perforation in the path of the needle comprises a stop in the form of a gate which by preventing the object from moving with the needle causes it to ride on to the needle, and which is adapted to open when the perforation is expanded by the separation of the parts of the needle, to leave a clear passage through both the perforation and the gate.

4. Apparatus as claimed in claim 1 in which the means to hold the object with the perforation in the path of the needle comprises a stop which by preventing the object from moving with the needle causes it to ride on to the needle; which stop is provided with the deforming member adapted to prevent the perforation from closing.

5. An apparatus as claimed in claim 1 in which the means for removing the object from the needle comprises a gate adapted to open to permit the passage of the needle but which closes as the needle withdraws after having penetrated the perforation, so that, although the needle can still pass, the gate wipes the object off the needle.

6. An apparatus as claimed in claim 1 in which the means to hold the object with the perforation in the path of the needle comprises a stop in the form of a gate adapted to open, when the perforation is expanded by the separation of the parts of the needle, to leave a clear passage through both the perforation and the gate; and the means for removing the object from the needle comprises a gate adapted to open to permit the passage of the needle but which closes as the needle withdraws after having penetrated the perforation so that it wipes the object off the needle; and in which the gates are arranged to open and the parts of the needle to separate when the needle is in the part of its reciprocating movement remote from the threading position of the object.

7. An apparatus as claimed in claim 1 in which the means to hold the object with the perforation in the path of the needle comprises a stop in the form of a gate adapted to open, when the perforation is expanded by the separation of the parts of the needle, to leave a clear passage through both the perforation and the gate; and the means for removing the object from the needle comprises a gate adapted to open to permit the passage of the needle but which closes as the needle withdraws after having penetrated the perforation so that it wipes the object off the needle; and in which the gates are arranged to open and the parts of the needle to separate when the needle is in the part of its reciprocating movement remote from the threading position of the object; in which the opening of the gates when the needle is in their immediate neighbourhood is controlled by the needle, but when the needle is at that part of its reciprocatory movement remote from the gates is controlled by cams reciprocating with the needle.

8. Apparatus as claimed in claim 1 which further comprises a twisting member adapted to hold the threaded wires so that they will not follow movements of the twisting member in the direction of their length but will be compelled to follow any rotational movement tending to twist the wires about each other; the said twisting member being arranged to reciprocate in time with the needle so that when the object is distended by the separation of the parts of the needle the twisting member will be in position for the ends of the wire to be fed to it by threading them through the object, and by the time the needle has reached that part of its travel remote from threading position the twisting member will have retired in the direction of the ends of the wires with a twisting movement.

9. An apparatus as claimed in claim 1 which further comprises a twisting member in the form of a rectangular slot of sufficient width to accommodate one wire loosely but of insufficient width to accommodate more than one wire across the width and having sufficient length to accommodate all the wires loosely; the said twisting member being arranged to reciprocate in time with the needle so that when the object is distended by the separation of the parts of the needle the twisting member will be in position for the ends of the wire to be fed to it by threading them through the object, and by the time the needle has reached that part of its travel remote from threading position the twisting member will have retired in the direction of the ends of the wires with a twisting movement.

10. An apparatus as claimed in claim 1 which further comprises a twisting member in the form of a key hole shaped slot, the rectangular part of which is of sufficient width to accommodate one wire loosely, but of insufficient width to accommodate more than one wire across the width, but whose length is sufficient to accommodate all the wires loosely; the said twisting member being arranged to reciprocate in time with the needle so that when the object is distended by the separation of the parts of the needle the twisting member will be in position for the ends of the wires to be fed into the circular part of the slot by threading through the object, and by the time the needle has reached that part of its travel remote from the threading position, the twisting member will have retired in the direction of the ends of the wires with a twisting movement, there being present means whereby the wires are forced into the rectangular part of the slot near the commencement of the twisting movement.

11. An apparatus as claimed in claim 1 including an automatic clutch mechanism designed to stop the apparatus when the object is distended by the separation of the parts of the needle.

12. An apparatus as claimed in claim 1 including an automatic clutch mechanism designed to stop the apparatus when the gates are open and the parts of the needle separated, the needle being in those parts of its reciprocating motion remote from the threading position.

13. An apparatus as claimed in claim 1 which further comprises a rod reciprocating in time with the needle and adjusting means connected with said rod on each reciprocation to deliver one of the objects from a feed hopper to the threading position.

DONALD GEORGE ASHCROFT.